July 18, 1972          H. M. FERRARI                3,677,894

INTERNALLY PRESSURIZED FUEL ELEMENT

Filed Aug. 14, 1969

United States Patent Office 3,677,894
Patented July 18, 1972

3,677,894
INTERNALLY PRESSURIZED FUEL ELEMENT
Harry M. Ferrari, Pittsburgh, Pa., assignor to Westinghouse Electric Corporation, Pittsburgh, Pa.
Continuation-in-part of application Ser. No. 706,291, Feb. 19, 1968, which is a continuation-in-part of application Ser. No. 615,542, Feb. 13, 1967. This application Aug. 14, 1969, Ser. No. 850,198
Int. Cl. G21c 3/18
U.S. Cl. 176—68                10 Claims

ABSTRACT OF THE DISCLOSURE

A fuel element for a pressurized nuclear reactor comprising a sealed cladding case, nuclear fuel therein and means for producing an internally pressurized atmosphere so that the fuel element is free standing, and characterized by metal wall cladding having a reduced thickness for conditions of reactor use.

CROSS-REFERENCE TO RELATED APPLICATIONS

This invention is a continuation-in-part of copending application Ser. No. 706,291, filed Feb. 19, 1968 (now abandoned), which is a continuation-in-part of application Ser. No. 615,542, filed Feb. 13, 1967 (now abandoned).

BACKGROUND OF THE INVENTION

Field of the invention

This invention relates to a fuel element for a nuclear reactor, and, more particularly it pertains to an internally pressurized fuel element therefor.

Description of the prior art

Pressurized water reactors are more efficient when operated at higher temperatures and pressures. At higher water pressures more heat per unit weight of water can be derived from a fuel element, because the water can reach a higher temperature and thereby absorbs more energy, before it reaches the boiling point at that pressure. The higher the temperature and pressure of the water coolant of a nuclear reactor the more energy is available for power purposes and more efficiently the reactor operates. The water functions as a moderator for the nuclear reaction, as well as a means for absorbing heat developed in the fuel elements, which heat is employed to develop steam in a separate steam generator.

Increasing the temperature and pressure conditions of operation of a water cooled reactor, however, is subjected to limitation that these conditions may cause the cladding of a fuel element or rod to collapse upon the surfaces of the fuel pellets contained therein and thereby accelerate possible failure. More particularly, the failure of cladding is accelerated because of the cyclic operation of a reactor over an extended period of time. When the demand for power is high, the fuel pellets heat up and expand thermally into contact with the cladding and bulge it outwardly. On the other hand, when power demand is reduced the fuel cools and contracts away from the cladding, and the external coolant pressure causes the cladding to collapse or sag against the surface of the fuel pellets. Although the extent of the relative motion of the walls of the cladding is small (about 0.5% to 1%), the cladding cannot sustain too many cycles at the temperatures of operation before it fails due to fatigue. For example, cladding composed of typical zirconium-base alloys known as zircaloy-2 and zircaloy-4 in cases of extreme movement beyond the elastic limit often will absorb only about 100 to 1000 cycles before fatigue failure. Stainless steel cladding is similarly prone to failure.

Furthermore, irradiation accentuates the cladding fatigue failure problem. Cladding in operating reactors becomes progressively more brittle due to irradiation and after long term operation it cannot be strained over about 1%. Although the water moderator-coolant per se is relatively non-radioactive, if the cladding cracks or breaks due to fatigue failure or if it develops pinholes so that radioactive gases and fuel components escape, the coolant becomes highly radioactive. For that reason the integrity of the cladding must be maintained or the reactor must be shut down more often for replacement of near-defective or defective cladding.

Associated with the foregoing is the fact that when uranium fuel fissions, it yields radioactive gases such as xenon and krypton isotopes which are released by diffusion from the uranium oxide ($UO_2$) fuel pellets. In the past it has been found desirable to provide a gas plenum storage chamber at the top of the fuel element so that the pressure from the radioactive gases generated during reactor operation at the end of the life of the fuel element is not materially greater than the external pressure of the water coolant surrounding the fuel element.

One obvious proposal for preventing collapse of the cladding has been to increase the cladding thickness. Increased cladding thickness however reduces the escape of neutrons to other fuel rods and adversely affects the neutron economy and thereby adds to the cost of the reactor operation. It is preferred to increase the neutron economy by reducing the cladding thickness if at all possible. For these reasons the designers of a pressurized water reactor have been confronted with opposing requirements of higher neutron economy requiring thin cladding, and the use of a cladding which is thick enough to sustain the external water coolant pressure to prevent collapse of the cladding.

While it has been proposed to introduce a gas such as hydrogen into a fuel element, such gases have been introduced at low pressures usually at atmospheric pressure and their function is to act simply as a heat transfer medium between the fuel pellets and the walls of the cladding.

Though the use of internally pressurized fuel elements is known such as taught by British Pat. No. 968,039, filed Aug. 27, 1962, the knowledge of the basic requirements for such a structure is limited. That patent is directed to a specific combination of components such as a beryllium sheath with a specific bore and wall thickness. There is a need for a more basic concept on which to calculate the necessary initial gas pressure for any given fuel element. This need is complicated by the release of fission gases during fuel burnup. Thus, the indicated British patent is not a complete answer to the problem of internal pressurization of hermetically sealed fuel elements.

SUMMARY OF THE INVENTION

It has been found that substantial benefit cannot be obtained simply by pressurizing a sealed fuel element. In accordance with the invention there is an important relationship between the maximum permissible initial pressure and the void volume required for a given particular design and operating history. In other words a predetermined void volume must be provided within the sealed fuel element in order to provide a useful pressurized fuel element. The void volume includes the plenum space within a hermetically sealed fuel element, the spaces at the ends and between the fuel pellets, as well as the open porosity of low density fuel. The fuel element can be employed in a boiling water reactor or other pressurized reactor system.

Accordingly, it is a general object of this invention to provide an internally pressurized fuel element having a reduced cladding thickness for high neutron economy.

It is another object of this invention to provide an internally pressurized fuel element having a non-collapsible cladding which avoids fuel element failure due to strain fatigue.

It is another object of this invention to provide an internally pre-pressurized fuel element the internal pressure of which is related to the plenum space or void volume therein.

Finally, it is an object of this invention to satisfy the foregoing objects and advantages in a simple and effective manner.

Briefly, the present invention consists in providing a free-standing elongated fuel element for a nuclear reactor comprising a tubular cladding enclosure, a body comprising preferably, a plurality of pellets of fissionable fuel material disposed within the tubular cladding enclosure, a plug disposed at each end of the tubular cladding enclosure and hermetically sealed thereto, space-means within the sealed cladding enclosure to contain therein a gas at a pressure of the order of from 600 to 3000 p.s.i. at operating temperatures to offset the pressures of water in a reactor and at least 100 p.s.i. at 25° C. The initial pre-pressurization interior of the fuel element is a function of the available space within the fuel element. Conversely, a desired initial and final internal pressure of a fuel element requires a predetermined void volume to be provided within the fuel element. In actual practice a gas at a pressure of at least 200 p.s.i. at 25° C. is provided within the clad fuel element to assure its withstanding external pressure, such as present in a pressurized water reactor. The thickness of the tubular cladding is about one-half that required to provide an acceptable fuel element without the gas pressure developing means. The hermetically sealed element has a space, preferably at one end to accommodate fission gases without developing excessive internal pressures over and beyond the pressures generated by gas pressure developing means. The internal void volume is a predetermined value. At room temperature the fuel element has a small clearance between the pellets of fissionable fuel material, and the walls of the tubular cladding material. The internal pressurization of the fuel element is not easily and efficiently effected by introducing into the tubular case a compound which will decompose by heating at a predetermined time after hermetically sealing of the element, to produce a large volume of gas.

BRIEF DESCRIPTION OF THE DRAWING

For a better understanding of the nature and objects of this invention reference is made to the drawings, in which similar numerals refer to similar parts in the several views of the drawing, and in which.

DESCRIPTION OF THE PREFERRED EMBODIMENTS

Figure 1:
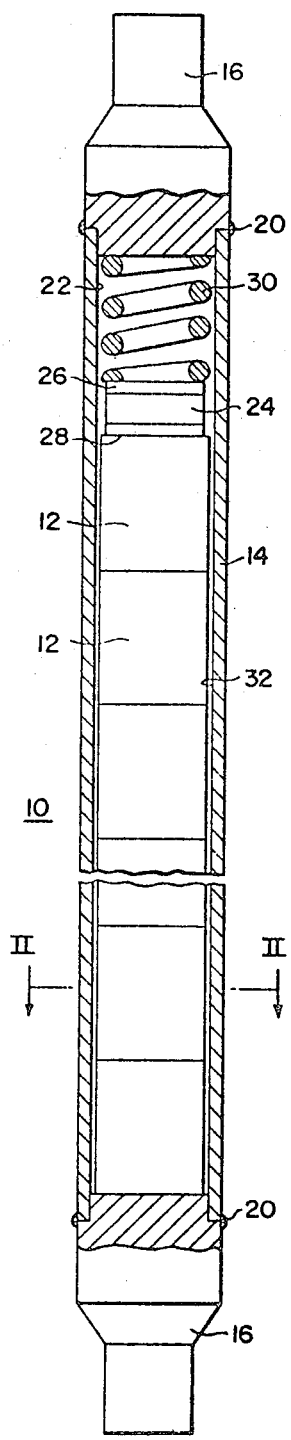
FIG. 1 is a vertical sectional view through a fuel element.
Figure 2:
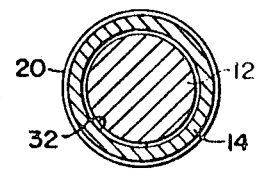
FIG. 2 is a horizontal sectional view taken on the line II—II of FIG. 1.

In FIG. 1 there is shown a fuel element 10 produced in accordance with the invention. It includes a plurality of cylindrical nuclear fuel pellets 12 disposed in end-to-end abutment within a casing or tubular cladding 14. The opposite ends of the cladding 14 are closed by sealing means such as end plugs 16 and 18 that are secured in place by annular welds at 20 by which means the interior of the fuel element is hermetically sealed. A plenum chamber 22 is provided at the upper end of the element to accommodate fission gases.

Within the chamber 22 a body 24 of a thermally decomposable compound is disposed on the upper end of the stack of fuel pellets 12. The body 24 is mounted between a pair of discs 26 and 28 of alumina. A helical spring 30 is disposed between the pellets 12 and the end plug 16 functioning to hold the pellets 12 compactly in place against the lower end plug 16.

The purpose of the thermally decomposable body 24 is to generate a gas to create an internal pressure within the fuel element 10 after the element is completely assembled and hermetically sealed. For that purpose the body 24 may be composed of at least one compound such as an oxalate or carbonyl or mixtures of two or more which compound thermally decomposes in a temperature range of from 200 to 600° F. Thus the element may be safely assembled and constructed if the temperature at 24 is below such temperature. Thereafter the sealed fuel element is heated above this temperature. At such elevated temperatures oxalates decompose into carbon dioxide or a mixture of carbon dioxide and carbon monoxide. While oxalates or carbonyls solid at temperatures up to the decomposition temperature are preferred, liquid absorbed in a carrier such as a molecular sieve or chelate can be used. An example of such an oxalate is iron oxalate ($FeC_2O_4$) which decomposes at about 160° C. in accordance with one or both of the following formulas:

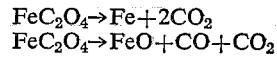

Carbonyls which thermally decompose in a temperature range of from 200° to 600° F. include $Ni(CO_4)$ and $Fe(CO_5)$ among others. Carbonyls decompose into CO in accordance with the following formula:

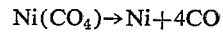

Other oxalates which decompose in the foregoing temperature range include $NiC_2O_4$, $Al_2(C_2O_4)_3$, and $MnC_2O_4$.

Both carbon monoxide and carbon dioxide are compatible with the material of which the fuel pellets 12 and the cladding 14 are composed. The fuel pellets are composed of uranium dioxide ($UO_2$) with enrichment with U–235, the magnitude of such enrichment being approximately two weight percent for some purposes.

The cladding 14 is composed of a metal which is substantially inert to the environment of the reactor including the liquid coolant surrounding the fuel elements, the carbon monoxide and carbon dioxide generated within each fuel element, as well as other corrosive factors such as influences of irradiation of the fuel pellets 12. The cladding 14 may be composed of a zirconium-base alloy such as zircaloy-2 or zircaloy-4 having a wall thickness of 0.023 for a tube of a 0.422 O.D. a diameter to thickness ratio of 18, or an austenitic stainless steel such as type 304, where the diameter to thickness ratio is from 30 to 40. Without pressurizing the diameter to thickness ratio is from 25 to 26 for stainless steel. The zirconium base alloys have a lower neutron absorption factor than the stainless steel. On the other hand, stainless steel cladding has a lower creep rate than zirconium base alloys; stainless steel having a negligible creep rate up to temperatures below 1000° F. and zircaloy having a negligible creep rate at temperatures up to about 600° F.

An example of an operable fuel element 10 in accordance with the invention may have an outside diameter of 0.444 inch and may have a length varying within wide limits and dependent upon the nuclear reaction chamber in which it is disposed. The diameter of the fuel element however usually will be less than 0.500 inch. For a given reactor the pellets 12 have a preferred diameter of about 0.400 inch. The clearance space 32 between the pellets 12 and the inner surface of the cladding 14 is approximately 0.003 inch. The purpose of the clearance space 32 is to allow for radial thermal expansion of the pellets 12 when the fuel element 10 is operating at the elevated temperatures of operation of the reactor. At such temperatures the pellets may expand as much as 0.004 inch in which event the clearance space 32 is completely filled and the surfaces of the pellets 12 are in snug and firm contact with the cladding 14. The cladding when of zircaloy has a thickness of approximately 0.017±0.001 inch and also expands slightly at the elevated temperatures of operation. The fuel element had manganese oxalate present which on being heated to 500° C. decomposed to produce sufficient gas to develop a pressure of 1500 p.s.i. at this temperature. This fuel element is more efficient and more satisfactory than a nonpressurized fuel element with 0.024 mil thick cladding.

A second example of a fuel element is one with stainless steel cladding, having a normal thickness of from about 0.015 inch, can be lowered to a thickness of about 0.0075 inch and avoid ultimate strain fatigue by internally pressurizing the fuel elements to 1000 to 2000 p.s.i.

In a pressurized water reactor more heat can be absorbed from the fuel element at higher water pressure because water absorbs more heat before it reaches the boiling point and is converted to steam. Accordingly, for the greatest efficiency it is desirable that the water coolant be at as high a temperature and pressure as possible.

By way of example, the fuel element of the present invention is designed to function in a pressurized water reactor in which when in operation the water has a pressure of between 2000 and 2250 p.s.i. At optimum operating conditions the temperature of the center of each pellet 12 is approximately 4200° F. with the surface pellet temperature being approximately 1100° F. The temperature of the inner surface of the cladding 14 is approximately 780° F. and that of the outer surface of the cladding is approximately 657° F. The peak temperature of the coolant water is approximately 649° F.

At those temperatures and pressure the cladding 14 is supported by the thermally expanded pellets 12 so that under normal conditions there is no problem of cladding fatigue strain due to the exceptionally high pressure of 2250 p.s.i. of the external water. The problem of cladding fatigue strain occurs due to repeated thermal contraction and expansion of the pellets 12 in response to shutting down and starting up of the reactor because of cyclical power demands such as may occur over a 24 hour period. When the reactor is shut down the pellets 12 contract due to cooling and thereby move out of supporting contact with the inner surface of the cladding. In the absence of internal gas pressure the cladding will sag, unless it is heavy walled, under the external pressure of 2250 p.s.i. of the water coolant. Conversely, when the reactor is started up again the pellets 12 heat up and expand until they come in contact with the cladding 14. Accordingly, without the internal gas pressures within the fuel element, the cyclical radial movement of the cladding in response to the heating and cooling of the fuel element, would cause excessive strain, with eventual fatigue and rupture of the cladding.

The relationship of the internal and external pressures of the fuel element controls the strain fatigue of cladding. Although the cladding bulges or contracts only about 0.05% to 1% of the tube diameter due to the expansion of the fuel pellets 12, in a typical case the minimum and expanded diameters are 0.400 inch and 0.404 inch, respectively, a difference of about 1%, failure of a thin cladding can occur between 100 and 1000 cycles at temperatures as it expands and contracts with the pellets. The premature fatigue failure problem is accentuated by the irradiation from the fuel which deteriorates and the metal cladding.

The provision of internal gas pressure in the fuel element to offset at least a major portion of the external pressure of the pressurized water coolant is sufficient to practically eliminate the foregoing problem of excessive strain and ultimate fatigue failure of the cladding. For example, if the external pressure of the water is 2250 p.s.i. and an internal gas pressure of 1000 p.s.i. is provided within the hermetically sealed fuel element, a resultant external pressure of only 1250 p.s.i. is present to react upon the cladding, which is insufficient to cause creep or sag of thin cladding as the fuel element cools. In other words the cladding need only be of sufficient thickness to withstand a pressure of about 1250 p.s.i. on its exterior surfaces. As a result the fuel may expand and contract thermally without plastically straining the cladding so long as there is a pressure within the fuel element. An internal gas pressure in moderate excess of the water pressure in the reactor may be present in the fuel element without giving rise to difficulties.

The initial internal gas pressurization within the fuel element is obtained by heating the fuel element where a body 24 of thermally decomposable matter such as $MnC_2O_4$ manganese oxalate is used. Most of the oxalates and carbonyls decompose thermally in the temperature range of from 200° to 600° F. As they decompose carbon monoxide and/or carbon dioxide fill the unoccupied portions of the interior of the fuel element 10 including the plenum chamber 22 and the clearance space 32. The gas pressure within the element ultimately developed varies with the amount of thermally decomposable substance placed in the fuel element. It may vary from 600 p.s.i. to 2000 p.s.i. initially.

Further, additional pressure is obtained during operation of the fuel element as the $UO_2$ fuel fissions and releases fission product gases such as krypton and xenon which increase the pressure within the fuel element.

While the use of a thermally decomposable compound is most convenient, other methods of obtaining the high internal gas pressure within the fuel element may be used. One such method is to hermetically fill the element with gas from a pressure source such as a tank of helium or argon gas. A still further method for internally pressurizing the fuel elements is to insert solid carbon dioxide within the fuel element and after sealing the element the Dry Ice decomposes to form carbon dioxide gas within the fuel element at a known pressure.

Another method for internally pressurizing the fuel rod is to heat the rod after fabrication in an atmosphere of helium gas, for example, at high pressures and elevated temperatures of about 1000° C. so that the helium may permeate the tubular fuel element and thereby produce the desired internal gas pressure. For iron and nickel base materials such as stainless steel, hydrogen gas is to be used for this process.

The preferred procedure for internally pressurizing the fuel element is to add an inert gas or mixture of two or more such gases alone, or in some cases, the addition of a thermally decomposable compound. Some reactive gases such as hydrogen are not desirable because of their detrimental effect on the cladding 14 where that is composed of a zirconium-base alloy such as zircaloy. Helium is preferred because of its relatively high thermal conductivity. Where it is used alone, helium is added at initial pressures varying from as low as 100 p.s.i. to about 1000 p.s.i. at room temperature (25° C.). When such a fuel element is introduced into a nuclear reactor and the external coolant fluid such as water is at high pressures, the gas filling the fuel element resists sagging and minimizes strains. At reactor operating temperatures of about 700° F., these initial pressures increase about three fold to 300 p.s.i. and 3000 p.s.i. respectively. The amount of gas added to internally pressurize the fuel rod is a function of other factors including the maximum operating temperature, the internal pressure developed by reaction product gases including xenon and krypton, the ultimate internal-external pressure differential, and the thickness of the cladding. The total internal gas pressure is composed of pressures developed by all pressure sources including the reaction product gases as well as the calculated amount of gas added to obtain the necessary ultimate internal pressure, whether the gas added is used with or without the addition of a thermally decomposable compound. For example, before the fuel element is finally hermetically sealed helium is added preferably without a thermally decomposable compound at a room temperature pressure of 300 p.s.i. which increases to an internal pressure (due to helium alone) of about 900 p.s.i. at 700° F. One method of hermetically sealing a fuel element with a gas under pressure is disclosed in the application of Eugene S. Boyko, Ser. No. 680,863, filed Nov. 6, 1967.

Initial pressurization (or pre-pressurization) of a fuel element is beneficial because it lowers the compressive stress on the fuel cladding and, thus, reduces creep down of fuel cladding, lowers the strain range, and increases the allowable number of fatigue cycles. Because of fission gas release and fuel swelling due to burnup, internal pressure increases with lifetime. To maintain a practicable end-of-life pressure additional void space is required for initial pressurization.

There is an important relationship between the maximum permissible initial pressure and the void volume required for a given particular design and operating history. Normally it is desirable to pressurize to the maximum permissible extent consistent with the maximum end-of-life pressure which may be dependent on operational accident or shipping accident limitations.

The amount of plenum space required depends primarily upon:

(1) the initial gas content,
(2) the amount of fission gas released which depends on the fuel temperature history which in turn is influenced by and dependent upon (a) power level, (b) burn-up, and (c) diametral gap, and
(3) the amount of free volume change due to fission swelling and thermal expansion of the fuel.

The allowable initial pressure is expressed by the formula:

$$P_i = [P_t(V_i + \Delta V) - RT_t N_{fg}] \frac{T_i}{V_i T_t}$$

where:

$P_i$ is the selected initial pressure (p.s.i.) (range 100 to 1000 p.s.i.)
$T_i$ is the temperature of gas for initial pressurization on an absolute scale (° R.) (normally 535° R.)
$V_i$ is the initial free void volume (in.$^3$) (minimum of 5% normally about 10%)
$\Delta V$ is the change in free void volume during life (does not exceed 7%)
$P_t$ is the allowable end of life pressure (p.s.i.) ranging from 1500 to 4500 p.s.i.
$N_{fg}$ is the moles of fission gas released into the free void volume (gm. moles) (this is dependent on the fuel and the extent of burnup)
$T_t$ is the gas effective temperature at end of life on an absolute scale (° R.) (960° R. to 1460° R.)
R is the universal gas constant By reversing the terms the inital free void volume is expressed by the formula:

$$V_i = \frac{T_i(P_t \Delta V - RT_t N_{fg})}{P_i T_t - P_t T_i}$$

$V_i$ ranges from 5% to 25% of the volume of the fuel volume, with 10% being the normal value.

Thus, the initial free void volume is a function of initial pressure, among other things. That volume includes the plenum spaces at the ends of the fuel element, the clearances between the pellets and between the pellets and cladding as well as open porosity in low density fuel. Where the initial pressure for a given design of fuel element is increased, the void volume must be increased.

Calculations of $P_i$ and $V_i$ employing the above formulas provide acceptable accuracy for fuel element design.

Internal pressurization has the important advantage that it results in reduced fuel swelling thereby preventing or delaying fuel-clad mechanical interaction and substantially reducing the probability of failure. The hydrostatic pressure imposed by the internal pressure on the fuel elements acts as a restraint which lowers fuel swelling. The greater the pressure, the greater its effect on reducing fuel swelling.

Under irradiation, nuclear fuels such as $UO_2$ swell. The swelling is attributed to the accumulation of solid and gaseous fission products. The gaseous fission products, such as xenon and krypton, form gas bubbles within the fuel matrix causing the fuel to expand rapidly. If an internal restraint such as a strong clad is used, the swelling is reduced when fuel-clad mechanical interaction occurs. Unfortunately, fuel-clad mechanical interaction while reducing fuel swelling results in high clad stresses and high probability of clad failure.

Fuel swelling is highly dependent on restraint. The hydrostatic pressure imposed by internal pressurization substantially reduced fuel swelling. Experimental irradiation results confirm these facts. An internally pressurized fuel element (500 p.s.i. at room temperature) was recently examined after several months of irradiation. Metallographic examination of this fuel element showed that the fuel actually densified slightly (initial density was ~93% of theoretical), whereas non-pressurized fuel elements irradiated under comparable conditions exhibited fuel swelling.

Thus internally pressurized fuel elements result in more reliable fuel elements by reducing fuel swelling, regardless of whether the cladding is designed to be free standing or collapsed.

Accordingly, the device and method of the present invention provides an internally pressurized fuel element for preventing premature rupture or failure of the cladding of the fuel element due to straining in response to cyclical operation of the reactor. The internally pressurized fuel element has the advantage of not only greater efficiency derived from operating at higher temperatures and pressures but also of greater neutron economy by the use of reduced cladding thickness.

Various modifications may be made within the spirit of this invention.

What is claimed is:

1. A fuel element suitable for use in a pressurized fluid cooled nuclear reactor comprising a plurality of pellets composed of nuclear material, a relatively rigid tubular cladding enclosing the pellets, means hermetically sealing the fuel element, the cladding having a clearance space with respect to the pellets to provide for thermal expansion and contraction between the pellets and the cladding, a relatively inert gaseous atmosphere at an initial selected pressure of between 100 and 1000 p.s.i. at manufacturing temperatures of about 25° C. within the tubular cladding to offset exterior fluid pressure which is applied on the cladding when in the reactor, whereby premature fatigue failure due to stresses and strains developed during cyclic operation of the reactor is avoided, and the fuel element having a predetermined plenum volume including the clearance space generally expressed in the formula:

$$V_i = \frac{T_i(P_t \Delta V - RT_t N_{fg})}{P_i T_t - P_t T_i}$$

where:

$P_i$ is the selected initial pressure (p.s.i.)
$T_i$ is the temperature of gas for initial pressurization on an absolute scale (° R.) (normally 535° R.)
$V_i$ is the initial free void volume (inch$^3$) (minimum of 5% of volume of fuel)
$\Delta V$ is the change in free void volume during life
$P_t$ is the allowable end of life pressure (p.s.i.)
$N_{fg}$ is the moles of fission gas released into the free void volume (gram moles)
$T_t$ is the gas effective temperature at end of life on an absolute scale (° R.)
R is the universal gas constant.

2. The fuel element of claim 1 in which the initial pressure is expressed by the formula:

$$_tP = [P_i(V_i + \Delta V) - RT_t N_{fg}] \frac{T_i}{V_i T_t}$$

3. The fuel element of claim 1 wherein the pressurized atmosphere includes helium gas.

4. The fuel element of claim 1 wherein the gas pressure inside the element is from about 300 to 3000 p.s.i. at an internal average gas temperature of about 700° F.

5. The fuel element of claim 1 wherein a thermally decomposable solid compound which fully decomposes to provide a gas when heated at an elevated temperature is present within the cladding whereby to provide additional gas pressure when the fuel element is subjected to reactor operating temperatures.

6. The fuel element of claim 5 in which said gas-forming thermally decomposable compound is within the cladding of the fuel element.

7. The fuel element of claim 5 in which the thermally decomposable compound is selected from a group consisting of oxalate, carbonyl, and solid carbon dioxide.

8. The fuel element of claim 5 in which the thermally decomposable compound is $MnC_2O_4$.

9. The fuel element of claim 1 in which the cladding is composed of an alloy selected from a group consisting of a zirconium base alloy and austenitic stainless steel.

10. A fuel element suitable for use in a pressurized fluid-cooled nuclear reactor comprising a plurality of pellets composed of nuclear material, a relatively rigid tubular cladding enclosing the pellets, means for hermetically sealing the fuel element, the cladding having a clearance space with respect to the pellets to provide for thermal expansion and contraction between the pellets and the cladding, a relatively inert gaseous atmosphere at an initial selected pressure of between 100 and 1000 p.s.i. at a manufacturing temperature of about 25° C. within the tubular cladding to offset exterior fluid pressure which is applied on the cladding when in the reactor, whereby premature fatigue failure due to stresses and strains developed during cyclic operation of the reactor is avoided, and the fuel element having a predetermined plenum volume, said plenum volume being sufficient both to accommodate both the expansion of the initial gaseous atmosphere at operating temperature and the collection of fission gases, and to yield an end of life pressure sufficiently near the external pressure so as to prohibit overstressing of the cladding.

References Cited

UNITED STATES PATENTS

| | | | |
|---|---|---|---|
| 3,244,599 | 4/1966 | Hilderbrand | 176—72 |
| 3,184,392 | 5/1965 | Blake | 176—67 |
| 3,291,698 | 12/1966 | Fortescue | 176—68 |
| 3,432,388 | 3/1969 | Fortescue | 176—37 |
| 3,466,226 | 9/1969 | Lass | 176—68 |

FOREIGN PATENTS

| | | | |
|---|---|---|---|
| 968,039 | 8/1964 | Great Britain | 176—68 |
| 1,184,573 | 6/1959 | France | 176—68 |
| 157,657 | 1/1957 | Sweden | 176—68 |

BENJAMIN R. PADGETT, Primary Examiner

G. G. SOLYST, Assistant Examiner

U.S. Cl. X.R.

176—79, 81